United States Patent [19]

Miura et al.

[11] 4,151,822
[45] May 1, 1979

[54] APPARATUS FOR SUPPORTING AN INTERNAL COMBUSTION ENGINE

[75] Inventors: Tatsuhiko Miura, Fujimi; Hiroyuki Ito, Asaka, both of Japan

[73] Assignee: Honda Giken Kogyo Kabushiki Kaisha, Tokyo, Japan

[21] Appl. No.: 793,372

[22] Filed: May 3, 1977

[30] Foreign Application Priority Data

May 6, 1976 [JP] Japan .......................... 51/56074[U]

[51] Int. Cl.² ...................... F16M 5/00; F16F 15/04
[52] U.S. Cl. ........................... 123/195 A; 123/192 R; 123/198 E; 180/64 R; 248/612; 267/63 R; 248/671
[58] Field of Search ........... 123/195 R, 195 A, 198 E, 123/192; 248/3, 9, 10; 267/63 R, 63 A; 180/64 R

[56] References Cited

U.S. PATENT DOCUMENTS

| 2,463,059 | 1/1949 | Saurer | 248/10 |
| 3,323,786 | 6/1967 | Boschi | 267/63 R |
| 3,329,230 | 4/1967 | Castelet | 180/64 R |
| 3,730,462 | 5/1973 | Dick | 248/10 |
| 3,762,671 | 10/1973 | Schulz | 248/9 |

FOREIGN PATENT DOCUMENTS

| 659765 | 2/1965 | Belgium | 248/10 |
| 1023343 | 1/1958 | Fed. Rep. of Germany | 180/64R |
| 1931940 | 2/1971 | Fed. Rep. of Germany | 248/10 |
| 2262231 | 10/1975 | France | 248/10 |

Primary Examiner—Charles J. Myhre
Assistant Examiner—Craig R. Feinberg
Attorney, Agent, or Firm—Haseltine, Lake & Waters

[57] ABSTRACT

The apparatus is employed to fixedly position an internal combustion engine upon a frame. The engine is normally provided with a pair of oppositely positioned arms which are affixed to the engine and project outwardly for connection to a frame. A supporting structure intermediate the engine and the frame is connected to the arms extending from the engine at a first point and to the frame at a second point. This supporting structure comprises a first and second spaced apart generally U-shaped members which have sloping parallel sides provided with a resilient mass therebetween. The first member is provided with a cover plate which is affixed thereto, and thereby forms a hollow chamber with the first member. Within this hollow chamber is disposed another resilient mass that in turn is enclosed by an abutment positioned thereabove. The second member is likewise provided with still another resilient mass which is positioned on a surface beneath the first member. The supporting structure defines the limit of travel of the engine due to external forces such as vibration.

7 Claims, 3 Drawing Figures

APPARATUS FOR SUPPORTING AN INTERNAL COMBUSTION ENGINE

BACKGROUND OF THE INVENTION

The present invention is directed to an apparatus for supporting an internal combustion engine on a frame such as is to be found in an automobile and a frame for such automobile. More particularly, the invention is directed to an apparatus employing a resilient mass disposed intermediate the automobile engine and frame in such a fashion as to eliminate undesirable instability and the like when the engine is in operation and is acted upon by certain external forces. The attempts by the prior art to overcome the basic problem of engine instability caused by vibration has experienced a number of shortcomings.

Where the arms extending from the engine for connection to the body frame extend obliquely from each side in a downward direction, and a resilient member is interposed between the arms and the frame of the body of the automobile, there is difficulty associated in successfully isolating the engine from vibration and in turn the position of the engine with respect to the exhaust system. This is due to the fact that the resilient mass normally employed is deformed in the shearing direction causing the engine to deflect from its fixed position. In turn the engine exhaust system exhibits a marked decreased life span.

Attempts to overcome this problem by the prior art have not been successful. A number of important considerations relating to engine support structure have not been considered and designed for deflection in the shearing direction by the resilient mass interposed between the engine and the frame.

SUMMARY OF THE INVENTION

The principal features of the present invention are directed to an apparatus for fixedly positioning an internal combustion engine upon a frame member, where the engine is provided with connecting arms which connect the engine to a body frame. The apparatus of the invention provides a support structure intermediate the engine and frame where a first support means is disposed above the frame and in fixed relation to the connecting arms. A second support, spaced from the first support is affixed to the frame member, and a resilient mass is interposed in the space between the first and second support means.

It is the main object of the present invention to overcome the defects of the prior art.

It is a further object of the present invention to provide an engine support structure disposed intermediate the engine and the frame upon which such engine is mounted to minimize the undesirable forces which may act upon the engine during operation.

Still a further object of the present invention is to provide a support structure including resilient members which are disposed intermediate the respective elements forming the support structure where such elements act chiefly in the compression direction of the resilient mass so that deflection in the shearing direction of the mass can be decreased and the engine in turn can be more stable during operation.

Other objects of the present invention if not specifically set forth herein will be obvious to one skilled in the art from a reading of the detailed description of the preferred embodiment of the invention, taken in conjunction with the drawings.

DESCRIPTION OF THE PREFERRED EMBODIMENTS

Figure 1:
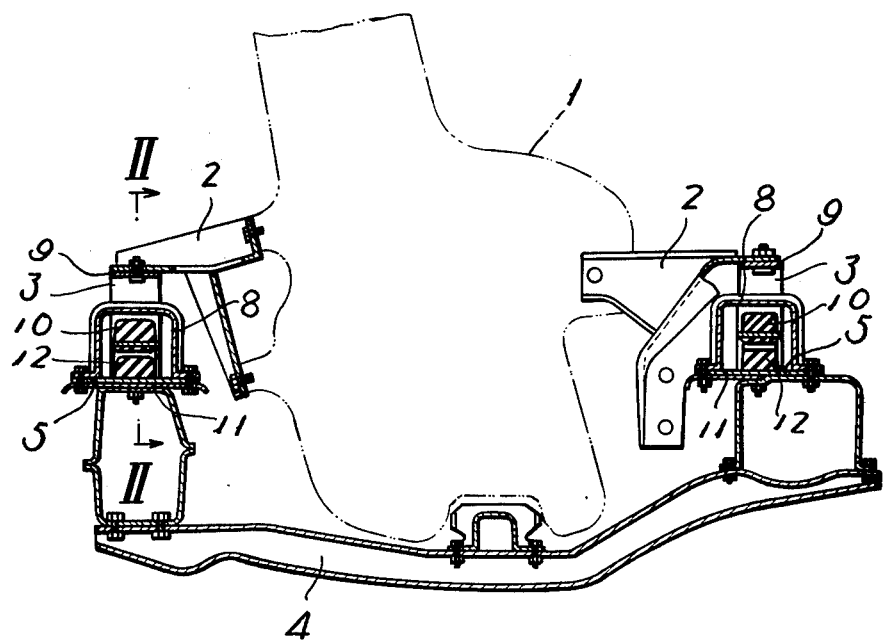
FIG. 1 is a sectional side elevation of the preferred embodiment of the present invention.
Figure 2:
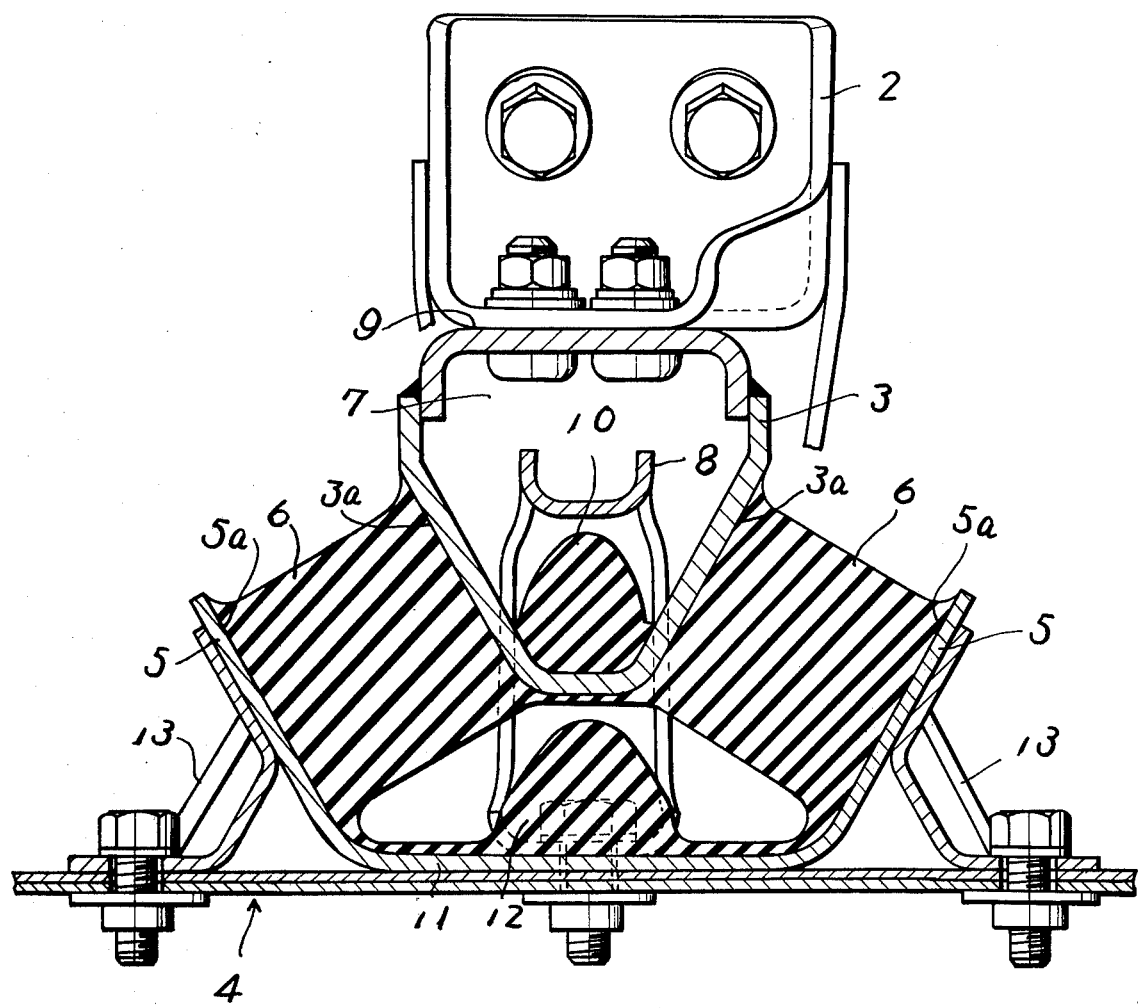
FIG. 2 is an enlarged sectional view of FIG. 1 taken along the line II—II in FIG. 1.

In general the present invention is directed to an improved engine support structure generally shown in FIG. 1. An internal combustion engine 1 is normally provided with arm members 2 projecting outwardly from both sides which are fixedly attached thereto. The arm members 2 are provided on their lower surfaces with attached leg members 3 which are generally U-shaped in cross-section. A car body frame 4 positioned below the engine is provided with seat plates 5 which are similarly U-shaped in cross-section. The leg members 3 are each supported on the seat plates 5 through an intermediate resilient member 6 which is interposed between the inclined surfaces 3a, 5a as shown in FIG. 2.

Each leg member 3 can be formed for an example by bending a sheet of material into a generally U-shaped structure such that a hollow portion 7 is formed therein. An abutment 8 fixed to the car body frame 4 is passed through the hollow portion 7. The top open surface of the generally U-shaped member 3 has fixed thereto a plate 9 so that the attachment of the arm 2 of the engine 1 may be readily carried out. A resilient projection 10 such as formed of rubber or the like, is disposed in the lower portion of the interior of hollow 7. This resilient member or projection 10 serves in a fashion that when the resilient member 6 is extended beyond a predetermined limit such as by vibration of the engine 1 or the like, the projection 10 strikes the abutment 8 and thereby prevents the leg member 3 and in turn the engine 1 from moving in a upward direction. The seat plate 5 is fixedly attached to the car body frame 4 which may be a beam or the like, at the flat surface 11 formed at the bottom portion of the seat plate 5.

The lower surface 11 of the seat plate 5 is provided with still another resilient projection 12. This projection serves to prevent the leg member 3 from being urged in a downward direction beyond a predetermined limit. This can occur due to vibration forces applied to the engine.

A reinforcing member 13 is intergral with the seat plate 5 and serves to reinforce the sloping surface 5a of seat member 5 from the rear.

The resilient mass 6 is interposed between the seat plate 5 and the associated leg member 3 at the sloping surfaces which are formed in parallel spaced relationship with respect to one another. This resilient member which has a comparatively small spring constant is acted upon by the leg member 3 chiefly in the compression direction so that deflection in the shearing direction of the resilient member 6 can be decreased. As a result, the engine 1 can be made more stable during operation and the exhaust system associated therewith will have an increased life span and the overall effective operation of the engine is increased due to isolation of engine vibration.

Figure 3:
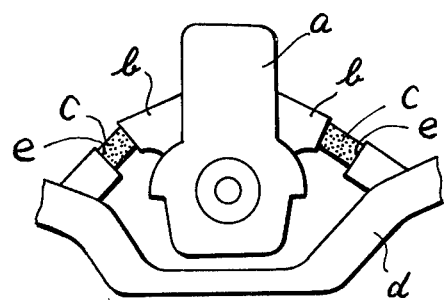
FIG. 3 is a side elevational view of the prior art structure.

FIG. 3 illustrates a typical prior art configuration. The internal combustion engine a is supported on arm members b extending obliquely downwards from the opposite sides of the engine a. Respective resilient members c formed of rubber or the like are provided intermediate the arm members b and the seat surfaces e which extend from the car body frame d. Due to the vibratory forces applied to the engine during operation, the resilient member c is deformed in its shearing direction and the position of the engine changes and is deflected from its set position, with the result that the exhaust system associated therewith has a marked decrease in life span.

It will be obvious to one skilled in the art from a reading of the foregoing description that many modifications and variations may be made without departing from the spirit and scope of the invention.

What is claimed is:

1. An apparatus for fixedly positioning an internal combustion engine upon a frame member where said engine is provided with connecting means projecting outwardly for connection to said frame member, said apparatus including: first support means disposed above said frame member in fixed relation to said connecting means; second support spaced from said first support means being affixed to said frame member, and first resilient means interposed in the space between said first and second support means; said first support means being defined by a generally U-shaped member having sloping leg portions and a first plate member affixed to an opening formed by the ends of said U-shaped member to thereby form an enclosed chamber having a hollow portion; said second support means being defined by a generally U-shaped member spaced from said first support means and having sloping leg portions in parallelism with the leg portions of said first support means; said first resilient means being disposed in the space formed by the opposite surfaces formed by respective sloping surfaces of said first and second support means; second resilient means disposed within said enclosed chamber extending in an upward direction, said second resilient means being spaced from and enclosed by abutment means fixedly attached to said frame member extending beyond said second resilient means into said chamber; said abutment means being passed through said hollow portion and fixed at both ends to said frame member by bolt means.

2. An apparatus as claimed in claim 1, wherein: third resilient means being disposed upon the non-sloping surface of said second support means in the space formed between said first and second support means.

3. An apparatus as claimed in claim 1, wherein: said resilient means is defined as having a small spring constant.

4. An apparatus as claimed in claim 1, wherein: said second support means being provided with reinforcement means extending from said frame to the exterior wall surface thereof.

5. Apparatus as defined in claim 1, including third resilient means disposed upon the non-sloping surface of said second support means in space formed between said first and second support means; said first resilient means being defined as having a small spring constant; said engine having connecting means defined by a pair of oppositely positioned arms each fixedly attached to first and second plate members, said plate members each being supported by said first resilient means adapted to control movement of said engine in response to outside forces; said first resilient means extending between opposite sides of said respective support means; said second resilient means being disposed within a first plate member for co-action with said arm members; said third resilient means being disposed on the lower surface of a second plate member in space formed between said first and second plate members; said second support means having reinforcement means extending from said frame to the exterior wall surface thereof.

6. An apparatus as claimed in claim 1, wherein: said engine being provided with connecting means defined by a pair of oppositely positioned arms each fixedly attached to first and second plate members, said plate members each being supported by resilient means adapted to control the movement of said engine in response to outside forces.

7. An apparatus as claimed in claim 6 wherein: said first resilient means extending between the opposite sides of said respective support means; said second resilient means being disposed within a first plate member for co-action with said arm members; and third resilient means disposed on the lower surface of a second plate member in the space formed between said first and second plate members.

* * * * *